Patented Jan. 19, 1960

2,921,922

RUBBER HAVING ENHANCED RESISTANCE TO DEGRADATION

James O. Harris, St. Albans, W. Va., assignor to Monsanto Chemical Company, St. Louis, Mo., a corporation of Delaware No Drawing. Application October 4, 1957
Serial No. 688,149

11 Claims. (Cl. 260—45.8)

This invention relates to a process of improving resistance to degradation of rubber. It particularly relates to preventing exposure cracking of rubber by incorporating therein a substance from the class of 3-aminocarbazoles and to the vulcanizates so obtained.

One of the major problems of the rubber industry is the protection of vulcanizates of sulfur-vulcanizable rubbers against exposure cracking of the vulcanizate due to ozone while under static or dynamic stress. In general, it has been found that antioxidants which are particularly effective for a certain type of rubber are substantially ineffective as antiozidants for the same type of rubber and vice versa.

It has now been found that the class of 3-aminocarbazoles having the general formula

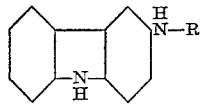

where R is hydrogen are effective for preventing exposure cracking of rubber. The compounds wherein R is an organic radical in which the carbon attached to the nitrogen is not part of an aromatic ring are particularly effective for preventing degradation by air or oxygen. Examples of organic radicals include methyl, ethyl, butyl, allyl, benzyl, cyclohexyl, cyclohexylmethyl, 1-methyl cyclohexylmethyl, 4-methylcyclohexyl, phenethyl, decyl, dodecyl, hexadecyl, isobutyl, sec. butyl, amyl, etc.

The 3-aminocarbazole may be prepared by catalytic reduction of the 3-nitrosocarbazole. The substituted compounds may be prepared by treatment of the 3-aminocarbazole with the appropriate ketone or aldehyde followed by catalytic reduction. Alkyl substituents may also be introduced by condensing 3-aminocarbazole with alkyl halides.

As illustrative of the control of exposure cracking of vulcanized sulfur-vulcanizable synthetic rubber-like materials, compositions were prepared as follows:

| Stock | A | B |
|---|---|---|
| | Parts by weight | |
| Butadiene-styrene copolymer rubber (GR-S 1500) | 100 | 100 |
| Carbon black | 50 | 50 |
| Saturated hydrocarbon softener | 10 | 10 |
| Zinc oxide | 4 | 4 |
| Stearic acid | 2.0 | 2.0 |
| Sulfur | 1.75 | 1.75 |
| Cyclohexyl-2-benzothiazolesulfenamide | 1.2 | 1.2 |
| 3-Aminocarbazole | | 1.5 |

The ingredients were admixed on a rubber mill in the customary fashion and the respective compounded stocks were cured in a press at 144° C. for 30 minutes. Since evaluation under static conditions is not indicative of the service obtained with many types of rubber articles which must withstand flexing, the vulcanized compositions were evaluated under dynamic conditions in an atmosphere containing a definite concentration of ozone. Samples of the stocks were cured in the form of a belt ½" wide, ¼" thick and 5 5/16" diameter and mounted on 1" diameter shafts. The ozone concentration was maintained at 20–30 parts per hundred million throughout the test and the shafts were rotated at 75 r.p.m. In this manner a momentary elongation through a range of 0–20% was provided at any portion of the test specimen passing over the shaft. (The apparatus and procedure employed is described by Creed et al. in Analytical Chemistry, vol. 25, page 241, February 1953.) The experimental test specimens were compared visually at various intervals, noting the extent of cracking. A stock which is severely cracked has no service life remaining in terms of the useful life of a rubber article and where the cracking is designated as very severe the degradation is well beyond even this point.

Table I illustrates the resistance of stock B (containing 1.5 parts of 3-aminocarbazole) to exposure cracking. The value recorded is the ratio of the cracking resistance to that of the untreated control (stock A) ran at the same time. This was obtained by assigning numbers as a measure of the degree of cracking. The numbers correspond to the degree of cracking as follows:

1. No cracking
2. Very slight cracking
3. Slight cracking
4. Moderate cracking
5. Severe cracking
6. Very severe cracking A set of stocks answering this description was used as a standard and each stock compared to this standard so as to assign a comparable numerical rating. The six degrees of cracking were designated on the vertical axis in reverse order, in other words beginning with six nearest the horizontal axis and ending with one at the top. Plotting the numerical ratings against exposure time in this manner gave a curve which approached the horizontal axis as the cracking progressed. Obviously, the greater the area under the curve the greater the degree of protection. Observations were made at intervals, usually after 8, 24, 48, 72 and 96 hours. The areas under the curves were either calculated or measured with a planimeter. The area under the curve for stock B was divided by the area under the curve for stock A and multiplied by 100. The resulting figure is the ratio of the protection as compared to the untreated stock as 100. The value is designated as protection ratio.

*Table I*

| Stock | Protection Ratio |
|---|---|
| A (control) | 100 |
| B | 237 |

As further examples of the invention, similar butadienestyrene copolymer rubber compositions were prepared containing 3-isobutylaminocarbazole and 3-benzylaminocarbazole as the protective agents except that N-tert. butyl-2-benzothiazolesulfenamide was substituted for the cyclohexyl-2-benzothiazolesulfenamide as the accelerator. The stocks were cured in a press at 144° C. for 60 minutes and evaluated as described. The stock containing 1.5 parts of 3-isobutylaminocarbazole gave a protection ratio of 190 as compared to the base stock alone as 100. The protection ratio was 118 for a stock containing 1.5 parts of 3-benzylaminocarbazole.

Natural rubber stocks were compounded comprising

| Stock | C | D | E |
|---|---|---|---|
| | Parts by weight | | |
| Smoked sheets rubber | 100 | 100 | 100 |
| Carbon black | 50 | 50 | 50 |
| Saturated hydrocarbon softener | 3 | 3 | 3 |
| Zinc oxide | 5 | 5 | 5 |
| Stearic acid | 3 | 3 | 3 |
| Sulfur | 2.5 | 2.5 | 2.5 |
| N-tert. Butyl-2-benzothiazolesulfenamide | 0.5 | 0.5 | 0.5 |
| 3-Benzylaminocarbazole | | 1.5 | |
| 3-Isobutylaminocarbazole | | | 1.5 |

The ingredients were admixed on a rubber mill in the customary manner, the respective compounded stocks cured in a press for 45 minutes at 144° C. and then aged for 72 hours at 100° C. in an air oven. The average tensile strength before and after aging was determined, the percentage of the original tensile retained being a measure of the antioxidant properties. The vulcanizates were evaluated for cracking resistance to ozone as aforedescribed. The results of the tests are set forth below:

Table II

| Stock | As Antioxidant, Percent Tensile Retained | As Antioxidant, Protection Ratio |
|---|---|---|
| C (control) | 16 | 100 |
| D | 66 | 106 |
| E | 59 | 145 |

It is obvious from the foregoing that the 3-aminocarbazoles of this invention are a class of compounds which improve the resistance of natural and synthetic rubber to exposure cracking.

It is to be understood that other desired filling and compounding ingredients may be incorporated in the rubber along with the 3-aminocarbazole. For example, there may be incorporated other accelerators, softeners, etc. as well as the customary rubber antioxidants.

The antidegradants may be incorporated into the rubber by milling or similar procedure or added to the rubber in the form of latex or applied to the surface of a mass of crude or vulcanized rubber. Amounts within the range of 0.1%–5.0% are satisfactory for most purposes.

By the terms "vulcanized rubber" and "sulfur-vulcanizable rubber" as employed in the appended claims, unless otherwise modified, is meant natural as well as synthetic rubbers which are capable of vulcanization when heated with sulfur and includes latices and reclaims of such materials. Examples include hevea, balata, gutta percha and synthetically prepared rubbery diene polymers, particularly polybutadiene-1,3 and copolymers of butadiene-1,3 with minor proportions of monovinyl compounds copolymerizable therewith.

It is intended to cover all changes and modifications of the examples of the invention herein chosen for purposes of disclosure which do not constitute departures from the spirit and scope of the invention.

What is claimed is:

1. A sulfur vulcanizable hydrocarbon rubber selected from the group consisting of natural rubber, synthetic diene polymers and copolymers thereof with a minor proportion of a monovinyl compound copolymerizable therewith containing an anti-exposure cracking amount of a 3-aminocarbazole of the formula

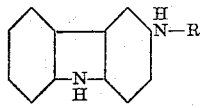

where R is a member of the group consisting of hydrogen, alkyl of 1–16 carbon atoms inclusive, allyl, phenyl substituted lower alkyl and saturated six-membered alicyclic radicals.

2. A sulfur vulcanizable hydrocarbon rubber selected from the group consisting of natural rubber, synthetic diene polymers and copolymers thereof with a minor proportion of a monovinyl compound copolymerizable therewith containing an anti-exposure cracking amount of a 3-aminocarbazole of the formula

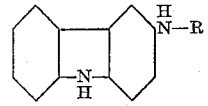

where R is hydrogen.

3. A sulfur vulcanizable hydrocarbon rubber selected from the group consisting of natural rubber, synthetic diene polymers and copolymers thereof with a minor proportion of a monovinyl compound copolymerizable therewith containing an anti-exposure cracking amount of a 3-aminocarbazole of the formula

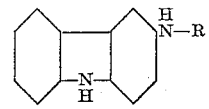

where R is an alkyl group of 1 to 16 carbon atoms.

4. A sulfur vulcanizable hydrocarbon rubber selected from the group consisting of natural rubber, synthetic diene polymers and copolymers thereof with a minor proportion of a monovinyl compound copolymerizable therewith containing an anti-exposure cracking amount of a 3-aminocarbazole of the formula

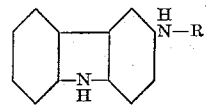

where R is a phenyl substituted lower alkyl group.

5. A vulcanized sulfur vulcanizable hydrocarbon rubber selected from the group consisting of natural rubber, synthetic diene polymers and copolymers thereof with a minor proportion of a monovinyl compound copolymerizable therewith containing an anti-exposure cracking amount of a 3-aminocarbazole of the formula

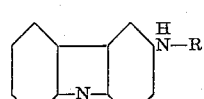

where R is an acyclic hydrocarbon group containing less than 9 carbon atoms in which the carbon to carbon bonds are not greater than two.

6. A vulcanized natural rubber composition containing an anti-exposure cracking amount of a 3-aminocarbazole of the formula

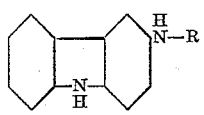

where R is a secondary lower alkyl group.

7. A vulcanized rubber composition containing an anti-exposure cracking amount of 3-cyclohexylaminocarbazole, said rubber being a butadiene-styrene copolymer.

8. A vulcanized rubber composition containing an anti-exposure cracking amount of 3-isobutylaminocarbazole, said rubber being a butadiene-styrene copolymer.

9. A vulcanized natural rubber composition containing an anti-exposure cracking amount of 3-benzylaminocarbazole.

10. An unvulcanized sulfur vulcanizable hydrocarbon rubber selected from the group consisting of natural rubber, synthetic diene polymers and copolymers thereof with a minor proportion of a monovinyl compound copolymerizable therewith containing an anti-exposure cracking amount of a 3-aminocarbazole of the formula

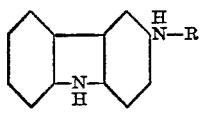

where R is a member of the group consisting of hydrogen, alkyl of 1–16 carbon atoms inclusive, allyl, phenyl substituted lower alkyl and saturated six-membered alicyclic radicals.

11. The process of improving the resistance to exposure cracking of a sulfur-vulcanizable butadiene-styrene copolymer rubber which comprises incorporating therein an anti-exposure cracking amount of 3-aminocarbazole.

References Cited in the file of this patent

UNITED STATES PATENTS

| | | |
|---|---|---|
| 1,836,702 | Christmann | Dec. 15, 1931 |
| 2,374,098 | Ingram | Apr. 17, 1945 |